United States Patent
Bibr et al.

(10) Patent No.: US 8,108,830 B2
(45) Date of Patent: Jan. 31, 2012

(54) SYSTEM AND METHOD FOR BUILDING WIRELESS APPLICATIONS WITH INTELLIGENT MAPPING BETWEEN USER INTERFACE AND DATA COMPONENTS

(75) Inventors: Viera Bibr, Kilbride (CA); Michael Shenfield, Richmond Hill (CA); Kamen B. Vitanov, Toronto (CA); Bryan R. Goring, Milton (CA)

(73) Assignee: Motorola Mobility, Inc., Libertyville, IL (US)

( * ) Notice: Subject to any disclaimer, the term of this patent is extended or adjusted under 35 U.S.C. 154(b) by 1220 days.

(21) Appl. No.: 10/788,490

(22) Filed: Mar. 1, 2004

(65) Prior Publication Data

US 2005/0057560 A1   Mar. 17, 2005

(51) Int. Cl.
*G06F 9/44* (2006.01)
*G06F 17/00* (2006.01)
*G06F 3/00* (2006.01)

(52) U.S. Cl. ........ 717/107; 717/115; 715/239; 715/249; 715/762; 707/100

(58) Field of Classification Search .................... 717/107
See application file for complete search history.

(56) References Cited

U.S. PATENT DOCUMENTS

| | | | |
|---|---|---|---|
| 6,026,238 A | 2/2000 | Bond et al. | |
| 6,330,006 B1 | 12/2001 | Goodisman | |
| 6,429,880 B2 | 8/2002 | Marcos et al. | |
| 6,578,068 B1 | 6/2003 | Bowman-Amuah | |
| 6,868,441 B2 * | 3/2005 | Greene et al. | 709/220 |
| 7,010,573 B1 * | 3/2006 | Saulpaugh et al. | 709/206 |
| 7,051,080 B1 * | 5/2006 | Paul et al. | 709/217 |
| 7,698,634 B2 * | 4/2010 | Bhatia et al. | 715/239 |
| 2001/0045963 A1 * | 11/2001 | Marcos et al. | 345/765 |
| 2002/0085020 A1 * | 7/2002 | Carroll, Jr. | 345/700 |
| 2003/0060896 A9 * | 3/2003 | Hulai et al. | 700/1 |
| 2004/0034833 A1 * | 2/2004 | Kougiouris et al. | 715/513 |
| 2005/0038796 A1 * | 2/2005 | Carlson et al. | 707/100 |
| 2005/0192984 A1 * | 9/2005 | Shenfield et al. | 707/100 |

(Continued)

FOREIGN PATENT DOCUMENTS

WO   WO 03/044654 A   5/2003

OTHER PUBLICATIONS

Krebs et al., "Mobile Adaptive Applications for Ubiquitous Collaboration in Heterogeneous Environments", 2002, IEEE, pp. 1-7.*

(Continued)

*Primary Examiner* — Thuy Dao
*Assistant Examiner* — Ben Wang

(57) ABSTRACT

A system and method for generating a screen element, based on a data object, of a component application is disclosed. The component application includes a data component having a data field definition and a screen component having a screen element definition. A mapping manager identifies a mapping present in the screen component. The mapping specifies dynamic relationships between the screen component and the data component by an identifier, and for selecting the data component mapped by the mapping according to the mapping identifier. The mapping manager maintains dynamic integrity and automatically synchronizes changes between the screen component and the corresponding data component. A data manager obtains a data object field value corresponding to the data field definition of the mapped data component; and a presentation manager generates a screen element from the screen element definition to include the data object field value.

46 Claims, 11 Drawing Sheets

U.S. PATENT DOCUMENTS

| | | | |
|---|---|---|---|
| 2005/0193361 A1* | 9/2005 | Vitanov et al. | 716/19 |
| 2005/0193370 A1* | 9/2005 | Goring et al. | 717/115 |
| 2005/0289457 A1* | 12/2005 | Obasanjo et al. | 715/513 |
| 2008/0313282 A1* | 12/2008 | Warila et al. | 709/206 |

OTHER PUBLICATIONS

Luyten et al., "An XML-based runtime user interface description language for mobile computing devices", 2001 Springer-Verlag, pp. 1-15.*

Souchon et al., "A Review of XML-compliant User Interface Description Languages", 2003, Springer-Verlag, pp. 377-386.*

Polyviou et al., "A Relationally Complete Visual Query Language for Heterogeneous Data Sources and Pervasive Querying", 2005 IEEE, pp. 1-12.*

Trewin et al., "Abstract User Interface Representations: How Well do they Support Universal Access?", 2003 ACM, pp. 77-84.*

Abrams M et al: UIML: an appilcance-independent XML user interface language: Computer Networks, Elsevier Science Publishers B.V., Amsterdam, NL, vol. 31, No. 11-16, May 17, 1999, pp. 1695-1708, XP004304584 ISSN: 1389-1286 *abstract*.

Austtralian Examination Report issued by the Australian Intellectual Property Office dated Mar. 12, 2008 for corresponding Australian Patent Application No. 2008202421.

Australian Examination Report issued by the Australian Intellectual Property Office dated Sep. 29, 2009 for corresponding Australian Patent Application No. 2008202421.

Canadian Office Action issued by the Canadian Intellectual Property Office dated Jun. 4, 2009 for corresponding Canadian Patent Application No. 2,498,540.

Chinese Office Action issued by the State Intellectual Property Office dated Jul. 27, 2007 for corresponding Chinese Patent Application No. 2005100524493.

European Examination Report issued by the European Patent Office dated Apr. 12, 2006 for corresponding European Patent Application No. 04 251 160.0.

European Examination Report issued by the European Patent Office dated Feb. 14, 2008 for corresponding European Patent Application No. 04 251 160.0.

Japanese Office Action issued by the Japanese Patent Office dated Mar. 25, 2008 for corresponding Japanese Patent Application No. 2005-053698.

Japanese Office Action issued by the Japanese Patent Office dated Sep. 7, 2009 for corresponding Japanese Patent Application No. 2005-053698.

Korean Office Action issued by the Korean Intellectual Property Office dated Sep. 1, 2006 for corresponding Korean Patent Application No. 10-2005-0016042.

Korean Office Action by the Korean Patent Office dated Apr. 28, 2007 for corresponding Korean Patent Application No. 10-2005-0016042.

Mexican Office Action issued by the Mexican Patent Office dated May 18, 2009 for corresponding Mexican Patent Application No. PA/a/2005/002276.

Mexican Office Action issued by the Mexican Patent Office dated Sep. 11, 2009 for corresponding Mexican Patent Application No. PA/a/2005/002276.

Taiwan Office Action issued by the Taiwan Intellectual Property Office dated Feb. 27, 2009 for corresponding Taiwan Patent Application No. 094105901.

Indian Office Action issued by the Indian Intellectual Property Office dated Feb. 25, 2010 for corresponding Indian Patent Application No. 414/DEL/2005.

* cited by examiner

SYSTEM AND METHOD FOR BUILDING WIRELESS APPLICATIONS WITH INTELLIGENT MAPPING BETWEEN USER INTERFACE AND DATA COMPONENTS

BACKGROUND OF THE INVENTION

This application relates generally to the display of wireless applications on a user interface of a wireless device.

There is a continually increasing number of wireless devices in use today, such as mobile telephones, PDAs with wireless communication capabilities, and two-way pagers. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing software applications for a variety of devices remains a difficult and time-consuming task.

Currently, devices are configured to communicate with Web Services or any other schema based back-end. Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. Native applications have the advantage of being developed specifically for the type of device platform, thereby providing a relatively optimized application program for each runtime environment. However, native applications have disadvantages of not being platform independent, thereby necessitating the development multiple versions of the same application, as well as being relatively large in size, thereby taxing the memory resources of the device. Further, application developers need experience with programming languages such as Java and C++ to construct these hard coded native applications, including hard coded static interactions of screen elements with data elements. There is a need for application programs that can be run on client devices having a wide variety of runtime environments using dynamic interactions between data and screen elements, as well as having a reduced consumption of device resources.

The systems and methods disclosed herein provide a linked screen and data component definitions environment to obviate or mitigate at least some of the above presented disadvantages.

SUMMARY OF THE INVENTION

It is desirable to drive down the complexity involved in developing the wireless application by reducing the need to do any explicit coding, as well as reducing device resources utilized by the application when provisioned. A system and method is described for effective management of a User Interface (UI) of a wireless device by implementing direct mapping between the application data domain and UI screens and controls. The device has an intelligent wireless device runtime environment (Device Runtime) that provides a set of basic services to manage the wireless application, including a series of linked screen and data component definitions, and their interactions can simplify the development effort and reduce resource allocation. The data domain for this category of applications is defined using the atomic data component definitions. The communication between a device user interface and data components is defined using atomic screen component definitions. Both screen and data component definitions are described in metadata using a structured definition language such as XML. The relationships between the screen and data component definitions are embedded in the XML definitions in the form of screen/data mappings. Typically, rendered screens for display are derived from some underlying data component and screens controls affected by user events impact the current state (or data representation) of the application Changes to the application domain data are automatically synchronized with the user interface, and user-entered data is automatically reflected in the application domain data. The primary mechanism behind this synchronization is the mapping of screens and data. This mechanism enables creation of dynamic and interactive screens. All changes to the data component can be immediately reflected on the screen and vice versa. This model allows building effective wireless applications based on server-to-device notifications. The data updates asynchronously pushed from the server are instantaneously reflected at the UI screen.

According to the present invention there is provided a method for generating a screen element of a wireless application based on a data object displayed on a user interface of a wireless device, the application including a data component having at least one data field definition and a screen component having at least one screen element definition, the component definitions expressed in a structured definition language, the method comprising the steps of: selecting the screen component corresponding to the screen element selected for display; identifying at least one mapping present in the screen component, the mapping for specifying a relationship between the screen component and the data component as defined by an identifier representing the mapping; selecting the data component mapped by the mapping according to the mapping identifier; obtaining a data object field value corresponding to the data field definition of the mapped data component; generating a screen element from the screen element definition to include the data object field value according to the format of the data field definition as defined in the mapped data component.

According to a further aspect of the present invention there is provided a system for generating a screen element of a wireless application based on a data object displayed on a user interface of a wireless device, the application including a data component having at least one data field definition and a screen component having at least one screen element definition, the component definitions expressed in a structured definition language, the method comprising the steps of: a mapping manager for selecting the screen component corresponding to the screen element and identifying at least one mapping present in the screen component, the mapping for specifying a relationship between the screen component and the data component as defined by an identifier representing the mapping, the mapping manager for selecting the data component mapped by the mapping according to the mapping identifier; a data manager for obtaining a data object field value corresponding to the data field definition of the mapped data component; and a screen manager for generating a screen element from the screen element definition to include the data object field value according to the format of the data field definition as defined in the mapped data component.

According to a still further aspect of the present invention there is provided a method for generating a data object of a wireless application based on a change in a screen element displayed on a user interface of a wireless device, the application including a data component having at least one data field definition and a screen component having at least one screen element definition, the component definitions expressed in a structured definition language, the method comprising the steps of: selecting the screen component corresponding to the screen element; identifying at least one mapping present in the screen component, the mapping for specifying a relationship between the screen component and the data component; selecting the data component mapped by the mapping; obtaining a changed value from the screen element corresponding to the mapped data component; assigning the changed value to a data field value of the data object according to the format of the data field definition as defined in the mapped data component.

According to a still further aspect of the present invention there is provided a device for generating a screen element of a wireless application based on a data object displayed on a user interface of a wireless device, the application including a data component having at least one data field definition and a screen component having at least one screen element definition, the component definitions expressed in a structured definition language, the method comprising the steps of: means for selecting the screen component corresponding to the screen element selected for display; means for identifying at least one mapping present in the screen component, the mapping for specifying a relationship between the screen component and the data component; means for selecting the data component mapped by the mapping; means for obtaining a data object field value corresponding to the data field definition of the mapped data component; means for generating a screen element from the screen element definition to include the data object field value according to the format of the data field definition as defined in the mapped data component.

According to a still further aspect of the present invention there is provided a computer program product for generating a screen element of a wireless application based on a data object displayed on a user interface of a wireless device, the application including a data component having at least one data field definition and a screen component having at least one screen element definition, the component definitions expressed in a structured definition language, the computer program product comprising: a computer readable medium; a mapping module stored on the computer readable medium for selecting the screen component corresponding to the screen element and identifying at least one mapping present in the screen component, the mapping for specifying a relationship between the screen component and the data component as defined by an identifier representing the mapping, the mapping module for selecting the data component mapped by the mapping according to the mapping identifier; a data module stored on the computer readable medium for obtaining a data object field value corresponding to the data field definition of the mapped data component; and a screen module stored on the computer readable medium for generating a screen element from the screen element definition to include the data object field value according to the format of the data field definition as defined in the mapped data component.

BRIEF DESCRIPTION OF THE DRAWINGS

These and other features will become more apparent in the following detailed description in which reference is made to the appended drawings by way of example only, wherein.

DESCRIPTION OF THE PREFERRED EMBODIMENTS

Network System

Figure 1:
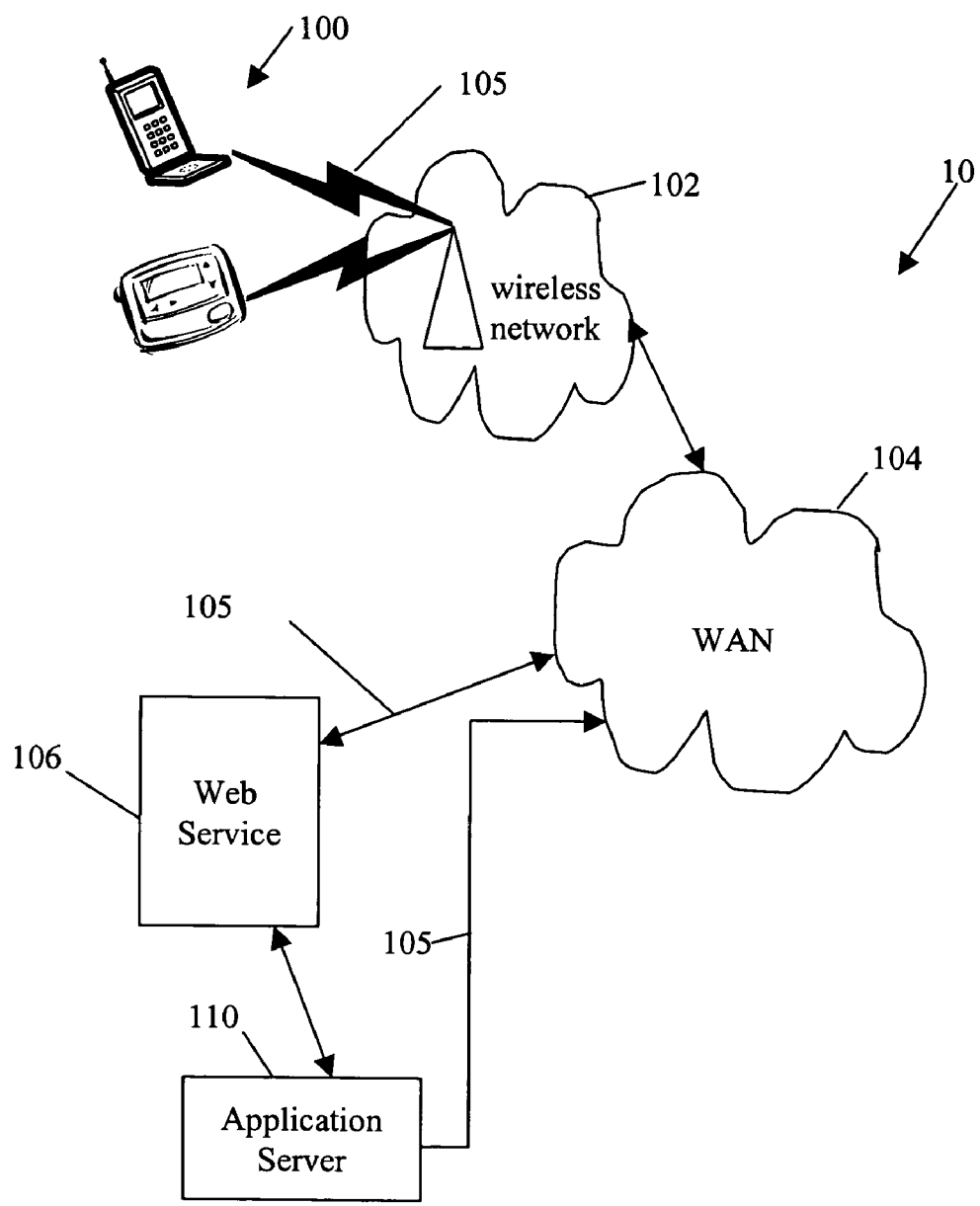
FIG. 1 is a block diagram of a network system.

Referring to FIG. 1, a network system 10 comprises a plurality of wireless devices 100 for interacting with one or more generic services 106, via a coupled Wide Area Network (WAN) 104 such as but not limited to the Internet. These devices 100 can be such as but not limited to, PDAs, pagers, cellular phones and the like. The generic services provided by the service 106 can be Web Services and/or other services such as but not limited to SQL Databases, IDL-based CORBA and RMI/IIOP systems, Legacy Databases, J2EE®, SAP RFCs, and COM/DCOM components. Further, the system 10 can also have a wireless network 102 for connecting the wireless devices 100 to the WAN 104. It is recognized that other devices (not shown) could be connected to the web service 106 via the WAN 104 and associated networks other than as shown in FIG. 1. Web services 106 defined according to a schema are selected for the following description of the system 10, for the sake of simplicity. However, it is recognized that other services could be substituted for the web services 106, if desired. Further, the networks 102, 104 of the system 10 will hereafter be referred to as the network 104, for the sake of simplicity.

Referring again to FIG. 1, the devices 100 transmit and receive requests/response messages 105, respectively, when in communication with the web services 106. The devices 100 can operate as web clients of the web services 106 by using the requests/response messages 105 in the form of message header information and associated data content, for example requesting and receiving product pricing and availability from an on-line merchant. The web service 106 is an example of a system with which client application programs 302 (see FIG. 2) on the communication devices 100 interact via the network 104 in order to provide utility to users of the communication devices 100.

For satisfying the appropriate requests/response messages 105, the web service 106 can communicate with an application server 110 through various protocols (such as but not limited to HTTP and component API) for exposing relevant business logic (methods) to client application programs 302 (see FIG. 2) once provisioned on the devices 100. The application server 110 can also contain the web service 106 software, such that the web service 106 can be considered a subset of the application server 110. The application programs 302 of the device 100 can use the business logic of the application server 110 similarly to calling a method on an object (or a function). It is recognized that the client application program 302 can be downloaded/uploaded in relation to the application server 110, through the messages 105 via the network 104, directly to the devices 100. It is further recognized that the devices 100 can communicate with one or more web services 106 and associated application servers 110 via the networks 104.

Server Environment

Referring to FIG. 1, the web service 106 provides the information messages 105 which are used by the client application programs 302 (see FIG. 2) on the devices 100 (either synchronously or asynchronously. Alternatively, or in addition, the web service 106 may receive and use the information messages 105 provided by the client application programs 302 executed on the devices 100, or perform tasks on behalf of client application programs 302 executed on the devices 100. The web service 106 can be defined as a software service, which can implement an interface such as expressed using Web Services Description Language (WSDL) registered in Universal Discovery Description and Integration (UDDI) in a web services registry, and can communicate through messages 105 with client devices 100 by being exposed over the network 104 through an appropriate protocol such as the Simple Object Access Protocol (SOAP). In some implementations, SOAP is a specification that defines the XML format for the messages 105, including a well-formed XML fragment enclosed in SOAP elements. SOAP also supports document style applications where the SOAP message 105 is a wrapper around an XML document. A further optional part of SOAP defines the HTTP binding (i.e. header), whereas some SOAP implementations support MSMQ®, MQSeries®, SMTP, or TCP/IP transport protocols. Alternatively, the web service 106 may use other known communication protocols, message 105 formats, and the interface may be expressed in other web services languages than described above.

Client Environment

Figure 2:
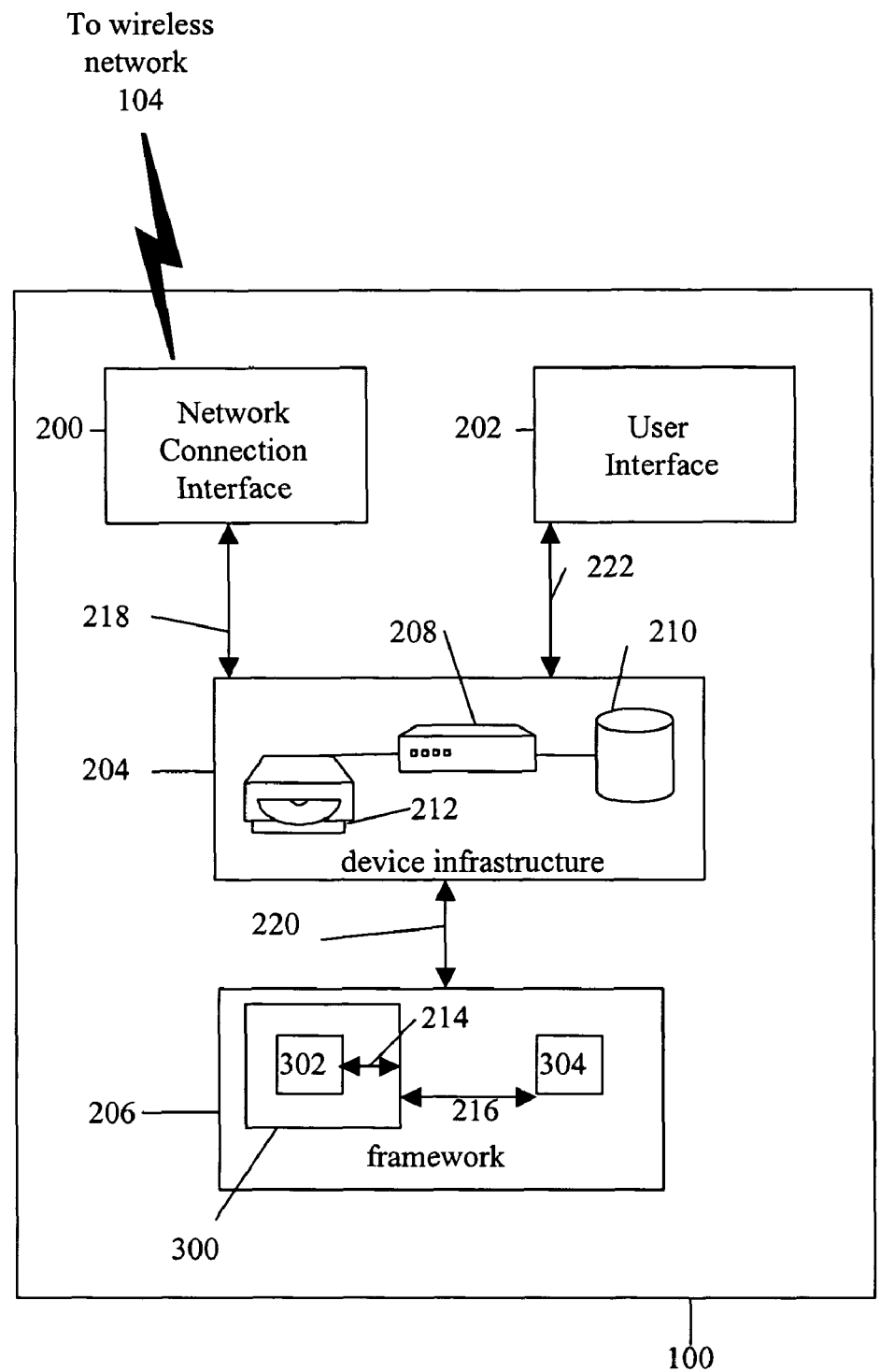
FIG. 2 is a block diagram of a wireless device of FIG. 1.

Referring to FIG. 2, the component applications 302 are transmitted via the network 104 and loaded into a memory module 210 of a device infrastructure 204 of the device 100. Alternatively, the component applications 302 may be loaded via a serial connection, a USB connections, or a short-range wireless communication system such as IR, 802.11(x) Bluetooth™ (not shown). Once loaded onto the device 100, the component applications 302 can be executed by an intelligent runtime framework 206 on the device 100, which can convert the component applications 302 into native code, which is executed by a processor 208 in the device infrastructure 204. Alternatively, the applications 302 may be interpreted by another software module or operating system on the device 100. In any event, the component applications 302 are run in the terminal runtime environment provided by the device 100, such that the runtime environment is an intelligent software framework 206 that provides a set of basic services to manage and execute typical application 302 behaviour (e.g. persistence, messaging, screen navigation and display).

Referring again to FIG. 1, the client runtime environment provided by the devices 100 can be configured to make the devices 100 operate as web clients of the web services 106. It is recognized that the client runtime environment can also make the devices 100 clients of any other generic schema-defined services over the network 104. The client runtime environment of the devices 100 is preferably capable of generating, hosting and executing the client application programs 302 (which include data 400 and screen 402 component definitions—see FIG. 4 and description herein below) on the device 100. Further, specific functions of the client runtime environment can include such as but not limited to support for language, coordinating memory allocation, networking, management of data during I/O operations, coordinating graphics on an output device of the devices 100 and providing access to core object oriented classes and supporting files/libraries. Examples of the runtime environments implemented by the devices 100 can include such as but not limited to Common Language Runtime (CLR) by Microsoft® and Java Runtime Environment (JRE) by Sun Microsystems®.

The terminal runtime environment of the devices 100 preferably supports the following basic functions for the resident executable versions of the client application programs 302 (see FIG. 2), such as but not limited to:

provide a communications capability to send messages 105 to the Web Services 106 or messages 105 to any other generic schema defined services connected via the network 104 to the devices 100;

provide data input capabilities by the user on an input device of the devices 100 to supply data parts for Web Services' 106 outgoing messages 105 (messages to the service);

provide data presentation or output capabilities for Web Services' 106 response messages 105 (incoming messages) or uncorrelated notifications on the output device;

provide data storage services to maintain local client data in the memory module 210 (see FIG. 2) of the device 100; and provide an execution environment for a scripting language for coordinating operation of the components 400, 402 (see FIG. 4) of the client application programs 302.

Figure 4:
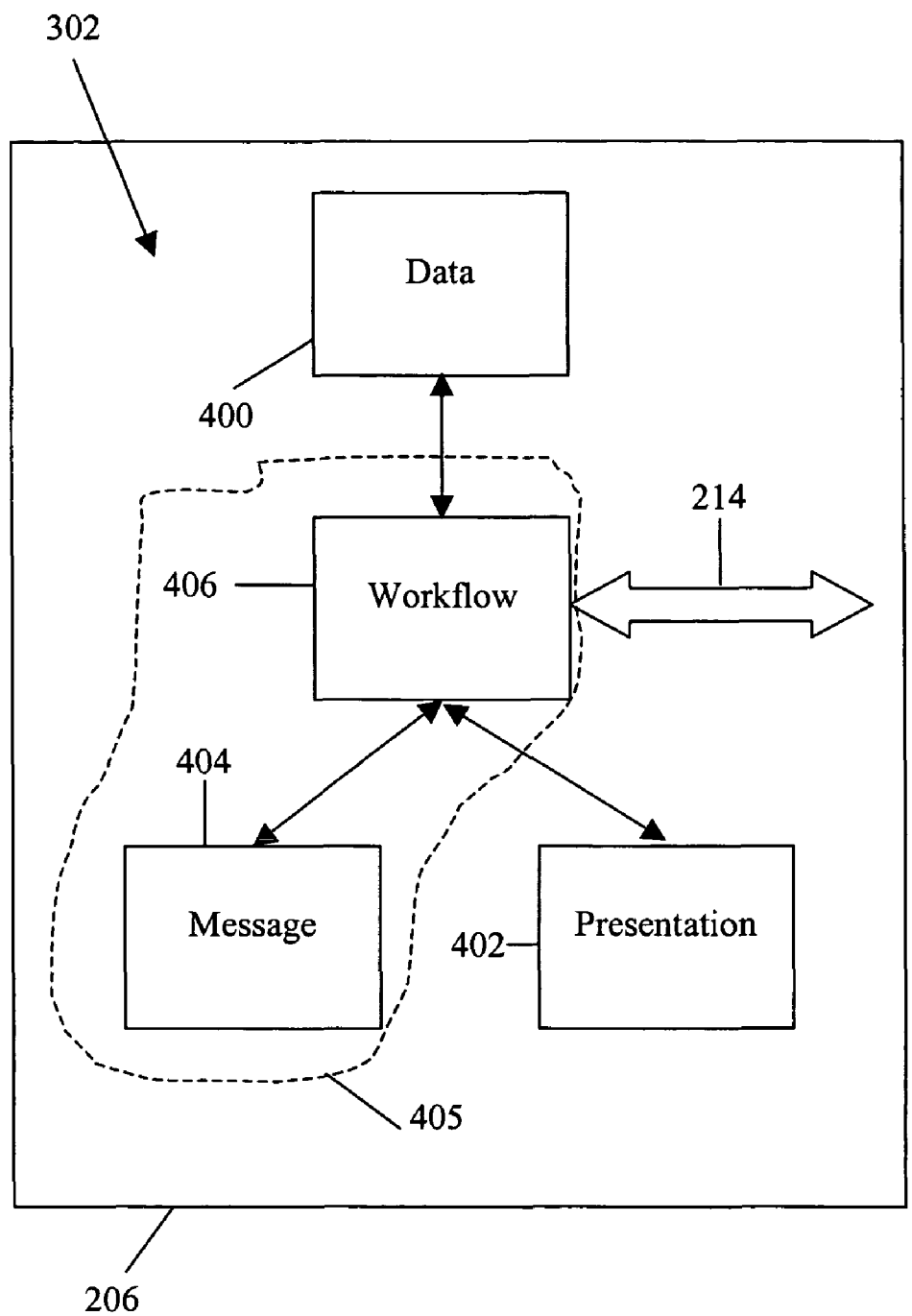
FIG. 4 is a block diagram of a component application program of FIG. 2.
Figure 5:
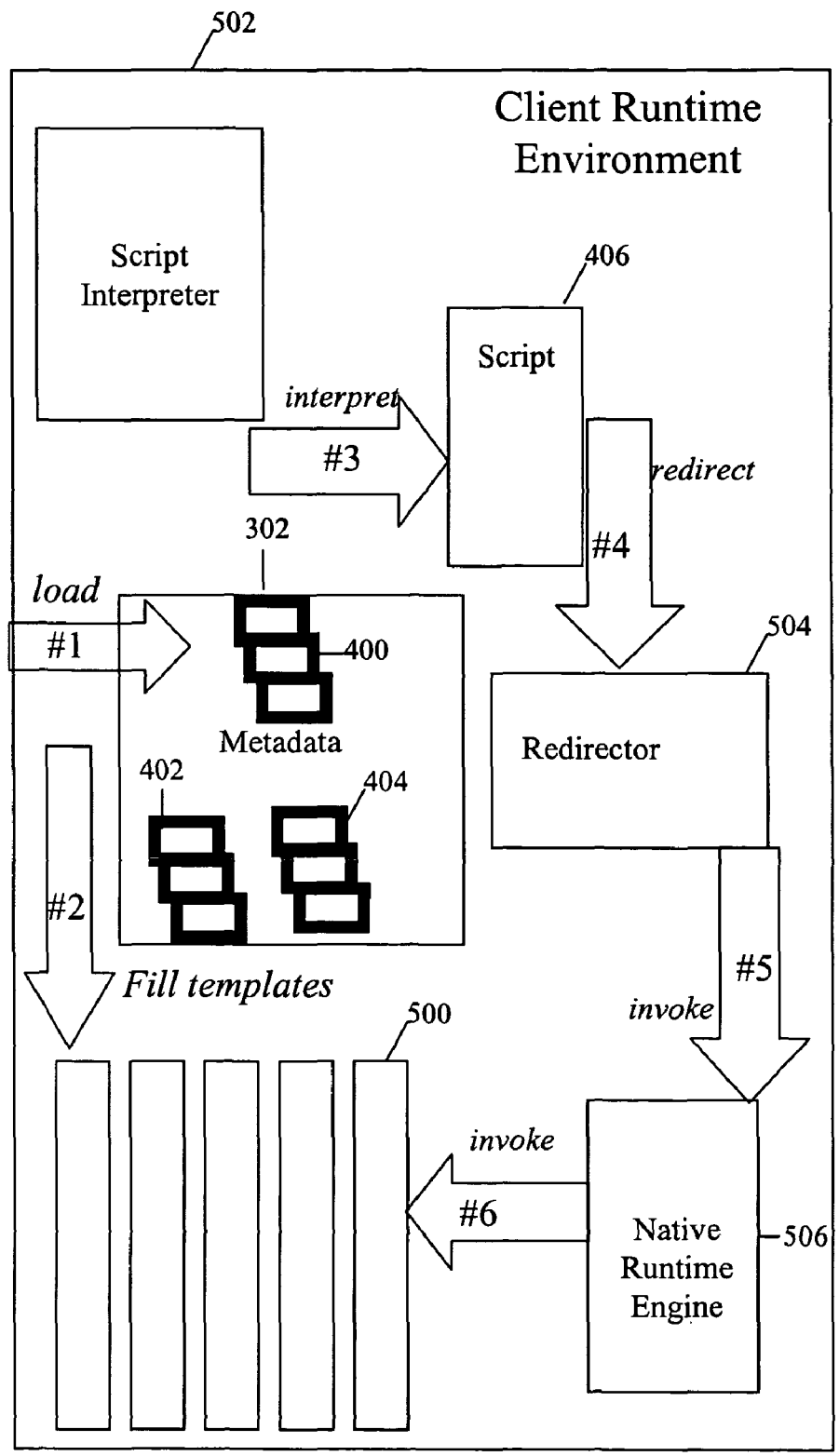
FIG. 5 shows a representative application packaging and hosting model for an example component application of FIG. 4.

Referring to FIGS. 2, 4 and 5, the client runtime (for example provided by the component framework 206) loads metadata contained in the component 400, 402 definitions and also builds the executable version of the application program 302 on the device 100, via for example an execution environment 300. There are, such as but not limited to, two operational models for client runtime: template-based native execution and metadata-based execution. In the case of a fully defined component based application 302 (having data 400, screen 402, message 404, and workflow 406 components—see FIG. 4), the framework 206 can implement a template-based native execution model for hosting data, message, and screen templates 500 pre-built on the device 100 using the native code. When the application program 302 definition is loaded, the client environment provided by the framework 206 fills the templates 500 with metadata-defined parameters from the components 400, 402, 404 and builds the executable client application program 302 in the native format. The workflow script (for example ECMAScript) of the workflow component 406 could be either converted to native code or executed using an appropriate script interpreter 502 (e.g., ECMAScript Interpreter) to a native code redirector 504, where the redirector 504 interprets calls to the scripting language into operations on native components through a native runtime engine 506. With the metadata-based execution, the runtime environment of the framework 206 either keeps component 400, 402, 404, 406 definitions in XML (for example), which are parsed during execution time or uses native representation of XML (for example) nodes. During execution, the native runtime engine 506 operates on definitions of the components 400, 402, 404, 406 rather than on native component entities. It is recognized that another type of execution model would include the application having component definitions 400, 402 for the data and screens while having a more hard-coded 405 approach for the remaining message and workflow elements of the application 302.

Therefore, the native client runtime environment provides an interface for the client application programs 302 to the device 100 functionality of the processor 208 and associated operating system of the device infrastructure 204. The runtime environment preferably supplies a controlled, secure and stable environment on the device 100, in which the component application programs 302 execute. The runtime environment provisions the definitions of the components 400, 402, (and definitions 404, 406 if used) to create the actual web client specific for each respective device infrastructure 204 of the device 100. It is recognized for the sake of simplicity that the following description hereafter will refer to the client runtime environment being provided by the framework 206, as an example only.

Communication Device

Referring to again to FIG. 2, the devices 100 are devices such as but not limited to mobile telephones, PDAs, two-way pagers or dual-mode communication devices. The devices 100 include a network connection interface 200, such as a wireless transceiver, coupled via connection 218 to a device infrastructure 204. The connection interface 200 is connectable during operation of the devices 100 to the network 104, such as to the wireless network 102 by wireless links (e.g., RF, IR, etc.), which enables the devices 100 to communicate with each other and with external systems (such as the web service 106) via the network 104 and to coordinate the requests/response messages 105 between the client application programs 302 and the service 106 (see FIG. 1). The network 104 supports the transmission of data in the requests/response messages 105 between devices and external systems, which are connected to the network 104. The network 104 may also support voice communication for telephone calls between the devices 100 and devices which are external to the network 104. A wireless data transmission protocol can be used by the wireless network 102, such as but not limited to DataTAC, GPRS or CDMA.

Referring again to FIG. 2, the devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the device 100 to coordinate the requests/response message messages 105 over the system 10 (see FIG. 1) as employed by client application programs 302 of a framework 206, further described below.

Referring again to FIG. 2, operation of the device 100 is enabled by the device infrastructure 204. The device infrastructure 204 includes the computer processor 208 and the associated memory module 210. The computer processor 208 manipulates the operation of the network interface 200, the user interface 202 and the framework 206 of the communication device 100 by executing related instructions, which are provided by an operating system and client application programs 302 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210.

It should be noted that the above listed example computer readable mediums 212 can be used either alone or in combination.

Mapping Relationships Between Components

Figure 8:
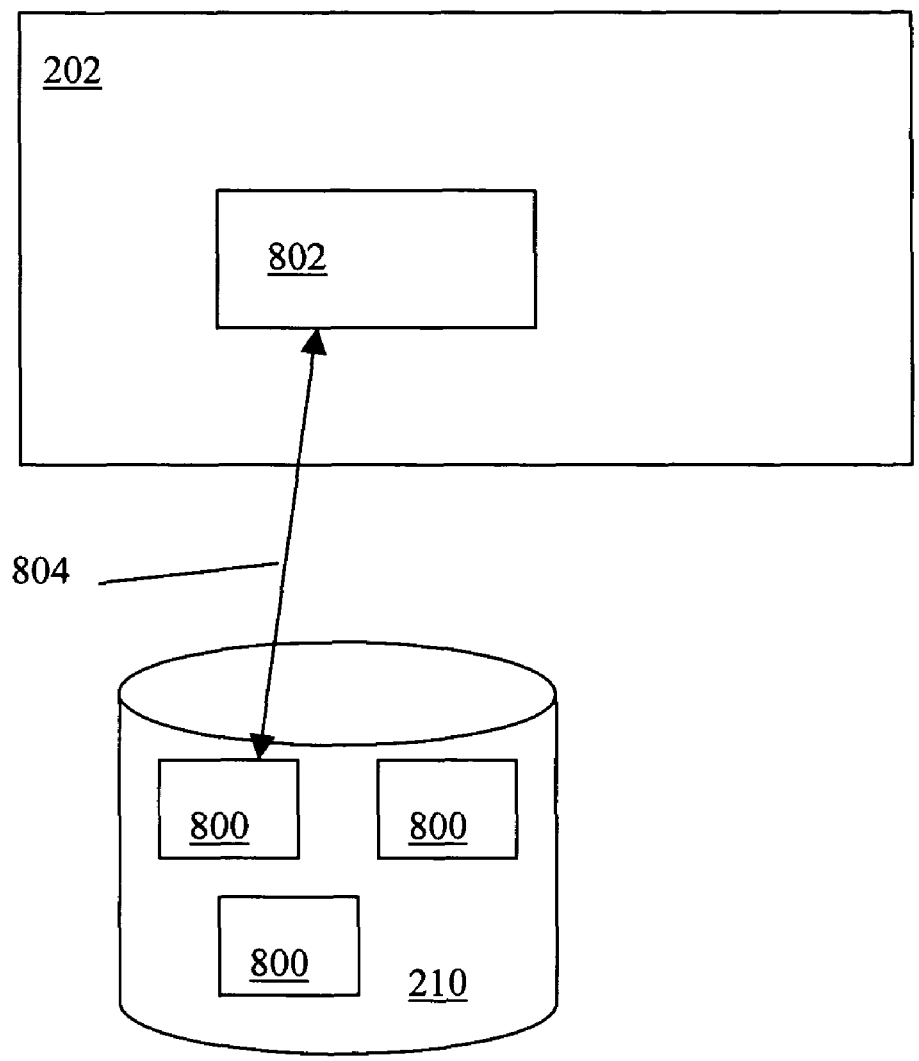
FIG. 8 shows a mapping between data and screen components for the application of FIG. 2.

In practice, typically the expression of the components 400, 402 by the developer can have overlapping content, while the behaviour of each of the components 400, 402 of the application 302 is distinct. Therefore, by recognizing the fact that user interface 202 (see FIG. 1) content is often generated from some underlying data element, and in light of the similarities between expression of these components 400, 402, it is convenient to introduce certain mappings 804 (see FIG. 8) to the expression of screen components 402, as further described below. Referring to FIGS. 4 and 8, these mappings 804 are essentially shortcuts to the expression of the screen elements 802 (screen element definitions) associated with the screen component 402, and how the screen component 402 behaves at runtime during execution of the application 302. The mapping 804 is a stated relationship between the screen element definitions of the screen component 402 and the data component 400 definition. In relation to expression of the screen component 402, using the mapping 804 can reduce the amount of metadata required to describe the component 402. Thus use of the mapping 804 can have a direct effect on the amount of "code" required to describe the application 302. In relation to how the component 402 behaves at runtime, the mapping 804 specifies how linked data elements (described by the data component 400) are resolved and affected by screen element 802 state. In this regard, specifying the mapping 804 can reduce the need for the developer to provide additional specific screen handling code in the application 302.

Referring to FIG. 8, screen representations of the screen components 402 (see FIG. 4) consist of screen elements 802, such as but not limited to UI controls, that are displayed on the user interface 202 and are associated with data field instances of the corresponding data objects 800. Therefore, each of the screen elements 802 is bound or mapped 804 to the fields of a respective data object 800. The user of the application 302 can select screen elements 802 on the user interface 202 (see FIG. 1) and edit the controls within them, i.e. by user events. Any modifications of the screen elements 802 are propagated to the data object 800 mapped to the screen element 802. Similarly, all modifications (driven by the application 302 logic or incoming server messages 105) to the data objects 800 are reflected in the screen elements 802 mapped to these data objects 800. Tracking of the user events and any direct modifications to the data objects 800 is monitored via a mapping manager 312, as described below. The mapping 804 provides for identification and modification of the data object 800 affected by the mapping 804. The mapping 804 isolates the data object 800 of the data component 400 to which the screen element 802 of the corresponding screen component 404 is linked.

It is recognised that either the screen component 402 or data component 400 definitions contain the mapping 800, which defines the relationship between the data object 800 and screen element 802 or the relationship between an individual data field (or group of data fields) of the data object 800 with screen element 802. It is recognised that the data object 800 may be passed to the user interface 202 as a parameter. In this case the data field values of the data object 800 mapped to the screen element 802 would be extracted from the passed parameter. For example, an edit control (screen element 802) defined in a screen field definition of the screen component 402 could be mapped into a data field definition of the linked data component 400 (i.e. a one to one mapping 804) or a choice control (screen element 802) defined in a screen field definition of the screen component 402 could be mapped into a particular data field definition of a collection of data components 400 (i.e. a one to many mapping 804).

Referring to FIGS. 4 and 8, screen component metadata can describe mapping to the data field definition of the linked data component 400 in addition to its other attributes. For example, a single screen element 802 may map to:
- one of the data field definitions of the data component 400 or
- all data field definitions of the data component 400 by a primary key (or mapping identifier)—in this case, the mapping 804 resolves to the primary key field.

A choice/list screen element 802 may map to:
- a collection of all instances of the data components 400 or
- one of the data field definitions of the data component 400 that is a collection Please refer to the example component application 302 below for an example of an edit screen element 802 'ebName' mapped to a 'name' field of a specific data object 800 of a 'User' data component 400, and an example of a choice screen element 804 'cbNames' mapped to a 'name' field of all data objects 800 of the 'User' data component 400.

Framework of Device

Referring again to FIG. 2, the framework 206 of the device 100 is coupled to the device infrastructure 204 by the connection 220. The client runtime environment the device 100 is provided by the framework 206, and is preferably capable of generating, hosting and executing the client application programs 302 (which include component definitions—see below) from meta-data definitions. The device runtime can be thought of as the intelligent software framework 206 that provides a set of basic services 304 to manage and execute typical application 302 behaviour, such as but not limited to persistence, provisioning, messaging, screen navigation and user interface/screen services. Therefore, the framework 206 provides the native client runtime environment for the client application programs 302 and is an interface to the device 100 functionality of the processor 208 and associated operating system of the device infrastructure 204. The framework 206 provides the runtime environment by preferably supplying a controlled, secure and stable environment on the device 100, in which the component application programs 302 execute in the application container or execution environment 300, for example.

Figure 3:
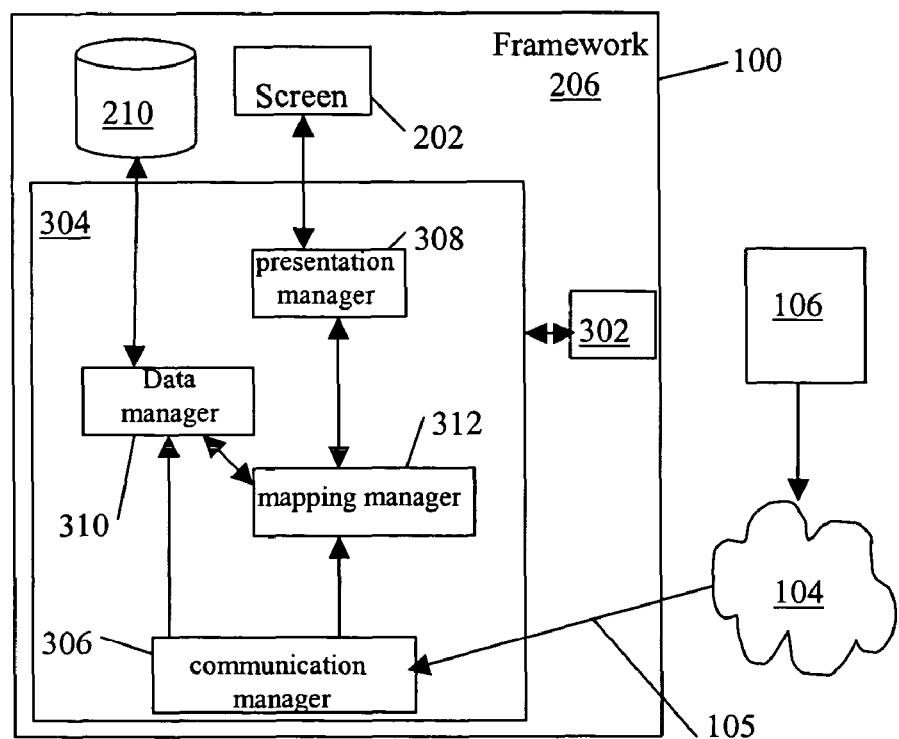
FIG. 3 is a block diagram of an intelligent framework of the device of FIG. 2.

Referring to FIG. 3, the framework 206 can be used to execute the client application programs 302 (such as Web Service client applications) within the terminal runtime environment and can support access to the Web Service 106 and associated application servers 110 (see FIG. 1), via the request/response messages 105 over the network 104. The component application programs 302 comprise software applications which are executed by the framework 206. The framework 206 creates the execution environment 300 for each component 400, 402 (and definitions 404, 406 if used—see FIG. 4) of the application program 302, each time that the application program 302 is executed. The execution environment 300 loads the components 400, 402 (definitions 404, 406 if used) of the application program 302 and can create native code which is executed by the processor 208 in the device infrastructure 204. The framework 206 therefore provides the host execution environments 300 for provisioning the definitions of the components 400, 402 (definitions 404, 406 if used) to create the actual web client specific for each respective device infrastructure 204 of the communication devices 100. The execution environment 300 can provision the application 302 as per the template-based native execution and metadata-based execution models as described above, by way of example only. The execution environment 300 can be referred to as a smart host container for the client application program 302, and can be responsible for analyzing screen values (of the screen elements 802 see FIG. 8) and for updating the representation of the values (data objects 800) in the memory module 210.

Referring again to FIG. 3, the framework 206 also provides framework services 304 (a standard set of generic services) to the client application programs 302, in the event certain services are not included as part of the components 400, 402 (definitions 404, 406 if used—see FIG. 4) or received as separate components (not shown) as part of the component application program 302. The application program 302 has communications 214 with the execution environment 300, which can coordinate communications 216 with the framework services 304, as needed. The framework services 304 of the framework 206 coordinate communications via the connection 220 with the device infrastructure 204. Accordingly, access to the device infrastructure 204, user interface 202 and network interface 200 is provided to the client application programs 302 by the framework 206 and associated services 304. It is recognized that a portion of the operating system of the device infrastructure 204 (see FIG. 2) can represent the execution environment 300 and selected services/managers of the framework services 304.

Referring to FIGS. 3 and 8, the framework services 304 includes such as but not limited to a communication manager 306, a presentation manager 308, a data manager 310, and can include an access service, a provisioning service and a utility service. The access service (not shown) provides the application programs 302 access to other software applications which are present on the communication device 100. The provisioning service (not shown) manages the provisioning of software applications 302 on the communication device 100. Application provisioning can include requesting and receiving new and updated application programs 302, configuring application programs 302 for access to services which are accessible via the network 104, modifying the configuration of application programs 302 and services, and removing application programs 302 and services. The utility service (not shown) is used to accomplish a variety of common tasks, such as performing data manipulation in the conversion of strings to different formats.

Figure 9:
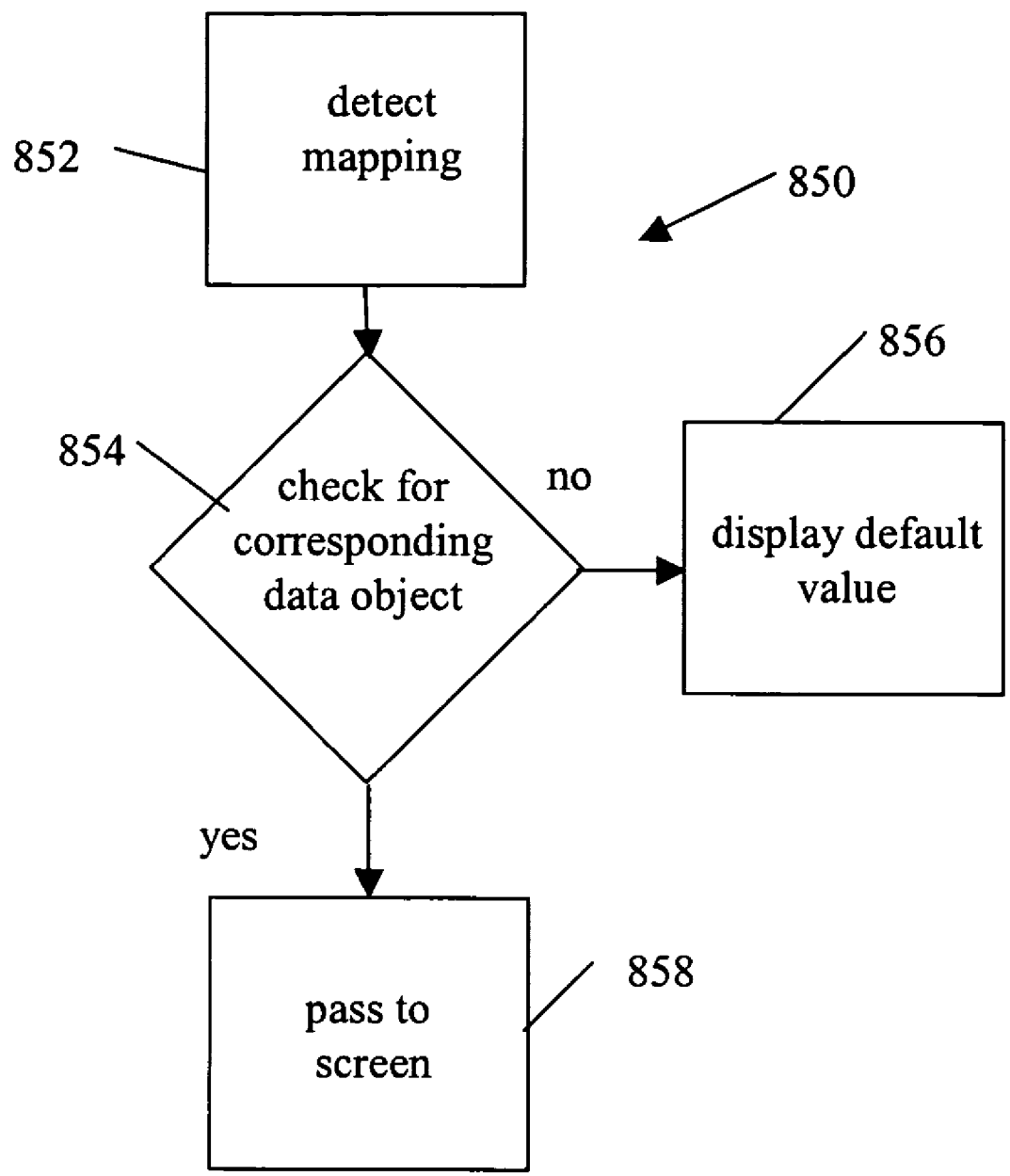
FIG. 9 shows an operation of initial screen display for the mapping of FIG. 8.

Referring to FIGS. 3, 8 and 9, a communication manager 306 manages connectivity between the application programs 302 and the external system 10, such as the messages 105 and associated data sent/received in respect to the web service 106 (by the communication manager 306) on behalf of the applications 302. As further described below the communication manager 306 can be used to implement a series of mappings 804. The presentation manager 308 manages the representation of the application programs 302 as they are output on the output device of the user interface 202 (see FIG. 2). The data manager 310 allows the component application programs 302 to store data in the memory module 210 of the device infrastructure 204 (see FIG. 2). It is recognised the data manager 310 can be used to coordinate the modification/creation of data instances of the data components 400 linked to the screen components 402 via the mappings 804. The framework 206 also has a mapping manager 312 that keeps track of the individual relations (mappings) 804 between the respective data objects 800 and the screen elements 802. The mappings are stored in a mapping table 309 coupled to the mapping manager 312. Once the screen elements 802 are initialized on the user interface 202, the presentation manager 308 uses the mapping manager 312 to maintain dynamic integrity between the screen elements 802 and the corresponding data objects 800 displayed. When one of the screen elements 802 is modified by the user via the user interface 202, the mapping manager 312 is responsible for propagating the change to the right data object 800 in the memory 210, through the data manager 310. When one of the data objects 800 in the memory 210 is modified, the mapping manager 312 checks to see if that object 800 is currently displayed on the User interface 202, and if so is then responsible for updating the corresponding screen elements 802 through the presentation manager 308, to reflect the change in the data object 800, by referring to the corresponding mapping 804 entry in the table 409. It is recognized that the framework services 304 of the communication device 100 provide functionality to the component application programs 302, which includes the managers described above.

Accordingly, the framework 206 allows for display of the interactive applications 302 on the user interface 202, which typically presents information from the application 302 domain and allow the user to enter and modify the related data objects 800 and screen elements 802. The framework 206 provides a system for effective management of the User Interface 202 by implementing the direct mappings 800 between the application data domain (data objects 800) and the UI screen elements 802 (e.g. UI controls). Changes to the application domain data objects 800 are automatically synchronized with the user interface 202, and user-entered data is automatically reflected in the application domain data objects 800. The primary mechanism behind this synchronization is the mapping 804 between paired screen element 802 and data object 800. The mapping system relates to wireless applications 302 defined using metadata expressed in a structured language such as XML. The mapping 804 mechanism enables creation of dynamic and interactive screens on the user interface 202. All changes to the data object 800 can be synchronously reflected on the user interface and vice versa. The implementation of mappings 804 facilitates building the wireless applications 302 based on server-to-device notifications. The data object 800 updates asynchronously pushed from the server (web service 106) are synchronously reflected by the linked UI screen element 802 on the user interface 202. These mappings 800 can be applicable for a variety of wireless applications 302 such as stock trading, news updates, alerts, weather updates.

Application Components

Referring to FIG. 2, the client application programs 302 are executed within the terminal runtime environment of the framework 206 and support access to Web Service operations provided by the service 106 (see FIG. 1). WSDL and SOAP protocol definitions clearly imply a messages/data pattern. In a WSDL Web Service definition, the operations are defined using the notion of messages and data parts, which can be used to define the Web Service client application programs 302 as a set of the related data 400 and the message 404 components (see FIG. 4).

Referring to FIG. 4, a block diagram of the component application program 302 comprises the data components 400, the presentation components 402. The remaining message/workflow part 405 of the application 302 can be provided by the message components 404, which are coordinated by workflow components 406 through communications 214 with the execution environment 300, or can be provided as hard-coded elements 405 of the application 302 (as defined by the application developer). The structured definition language can be used to construct the components 400, 402 (and 404 if used) as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, (and 404 if used) to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MIME).

Referring again to FIGS. 4 and 8, the data components 400 define data objects 800 which are used by the component application program 302, including application data represented in for example native code or XML. Examples of data objects 800 which data components 400 may describe are orders, users, and financial transactions. Data components 400 define what information is required to describe the data objects 800, and in what format the information is expressed. For example, the data component 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400. Since data parts (elements) are usually transferred from message 105 to message 105 according to Web Services' 106 choreography rules, preferably there is persistence of data objects 800. Data objects 800 may be dynamically generated according to Web Services' 106 choreography definitions (if available) or defined by the application designer based on complex type definitions and/or message correlation information. It is recognised that the screen components 402 can be linked via the mappings 804 to the data components 400 (see FIG. 9), as further described below.

Further, the data components 400 can consist of a series of data field definitions written in such as but not limited to HTML, XHTML, XML and other structured definition languages, wherein the data objects 800 (see FIG. 8) are data instances according to the data field definitions. It is noted that data object definitions provide definitions of the structure of data fields and their corresponding data types, such that data objects 800 are instances of a particular data object definition. Data Fields comprise the data object definitions and every data field has an associated data type. Further, Complex Data Fields contain a structure of sub-data fields. The definitions of the data objects 800 are included in the data component 400 schema of the application 302. These data definitions provide a data model for defining the data objects 800 as used by the application 302. Accordingly, the Data Component 400 is a set of one or more data field definitions grouped together to define the format of corresponding data field values when instantiated as the data object 800. The data component 400 definitions can have a primary or a composite key or optionally be defined without a key. The keys can be used with the mappings 804 to provide a unique link between a pair of the mapped data 400 and screen 402 components.

Referring again to FIG. 4, the presentation/screen components 402 define the appearance and behavior of the application program 302 as it displayed by the user interface 202. The presentation components 402 can specify GUI screens and controls, and actions to be executed when the user interacts with the component application 302 using the user interface 202. For example, the presentation components 402 may define screens, labels, edit boxes, buttons and menus, and actions to be taken when the user types in an edit box or pushes a button. The majority of Web Service consumers use a visual presentation of Web Service operation results, and therefore provide the runtime environment on their devices 100 capable of displaying user interface screens.

An example application 302 of a passing a parameter to the screen component 402 as well as for the screen component 402 that accepts the passed parameter is illustrated below. Consider an application with:
  data component 400 'User'
  screen component 402 'scrAllUsers' listing a choice box of all user names, with button/menu item to display a details of selected user
  screen component 402 'scrUserInfo' displaying details for a user passed as a parameter

EXAMPLE XML DATA COMPONENTS 400

Data Component 400 'User' with primary key field 'name' can be defined using the following metadata:

```
<cData name="User" pkey="name" >
    <dfield name="name" type="String" />
    <dfield name="street" type="String" />
    <dfield name="city" type="String" />
    <dfield name="postal" type="String" />
    <dfield name="phone" type="String" />
</cData>
```

EXAMPLE XML PRESENTATION COMPONENTS 402

The 'scrAllUsers' screen can define a choice control 'cbNames' mapped to a 'name' field of all instances of the 'User' data component 400. The screen metadata definition contains a button or menu item with an action to display screen 'scrUserInfo' with parameter 'User' selected, passed as a parameter to the user interface 202.

```
<cScr name="scrAllUsers" >
    ...
    <choice name="cbNames" mapping="User[].name" />
    ...
    <action screen="scrUserInfo" param="cbNames.selected"/>
    ...
</cScr>
```

A screen 'scrUserInfo' defines an edit control 'ebName' mapped to a 'name' field of a specific instance of 'User' data component 400 passed as a parameter:

```
<cScr name="scrUserInfo" param="User">
    ...
    <edit name="ebName" mapping="User.name" />
    ...
</cScr>
```

Referring again to FIG. 4, the remaining message and other workflow parts 405 of the application 302 can be provided by hard-coded application 302 elements and/or can be provided as further components 404, 406 described in the structured definition language and code/script respectively. In the case of using atomic message components 404, these define the format of messages 105 used by the component application program 302 to communicate with external systems such as the web service 106, and include message data represented in for example native code or XML. For example, one of the message components 404 may describe such as but not limited to a message for placing an order which includes the unique identifier for the order, the status of the order, and notes associated with the order. Message component 404 definitions written in the structured definition language can uniquely represent (and map to) WSDL messages, and can be generated dynamically at runtime. Web Service messages 105 are defined within the context of operation and there is defined correlations between the message components 404 in the component application program 302 definition. This correlation could be done using predefined message parameters and/or through separate workflow components 406, as further defined below.

Referring again to FIG. 4, in the case of using the atomic workflow components 406 of the component application program 302, these define processing that occurs when an action is to be performed, such as an action specified by a presentation component 402 as described above, or an action to be performed when messages 105 (see FIG. 1) arrive from the system 10. Presentation workflow and message 105 processing can be defined by the workflow components 406. The workflow components 406 are written as a series of instructions in a programming language or a scripting language, such as but not limited to ECMAScript, and can be compiled into native code and executed by the execution environment 300, as described above. An example of the workflow components 406 may be to assign values to data, manipulate screens, or send the message 105. The workflow component 406 supports a correlation between the messages 105 and defines application flow as a set of rules for operations on the other components 400, 402, 404. Multiple workflow components can be defined with respect to a given application program 302.

Example components 404, 406 for component based applications 302 could be:

EXAMPLE XML MESSAGE COMPONENTS 404

```
<msg name="ordConfirmation" type="response" action="mhConfirmation">
    <part name="orderId" type="String" />
    <part name="status" type="String" />
</msg>
...
```

EXAMPLE ECMASCRIPT WORKFLOW COMPONENTS 406

```
<actions>
    <function name="mhConfirmation">
        key = ordConfirmation.orderId;
```

-continued

```
        order = Order.get(key);
        order.orderStatus = ordConfirmation.status;
        scrConfirmation.display(order);
    </function>
    ...
</actions>
```

Expressing the data 400, message 404, and presentation 402 components using XML or its derivatives, and the workflow component 406 using the ECMAScript language or its subset, can allow an application developer to abstract the Web Service client from any specific platform or environment and implement in principle "develop once run everywhere" applications. The following example shows how a Web Services client application program 302 could be expressed using a structured definition language, such as but not limited to XML, and a platform neutral scripting/programming language, such as but not limited to ECMAScript, defined components.

Further, referring to FIG. 4, as given above, it can be seen that the message components 404 can relay the required data for the input and output of the messages 105. The corresponding data components 400 coordinate the storage of the data in the memory module 210 (see FIG. 2) of the device 100 for subsequent presentation on the user interface 202 (see FIG. 2) by the presentation components 402. The workflow components 406 can coordinate the transfer of data between the data 400, presentation 402, and message 404 components. The client runtime is capable of storing and updating atomic data objects 800 directly.

EXAMPLE BASIC OPERATION OF A COMPONENT BASED APPLICATION MODEL

It should be noted that the operation detailing processing mappings 804 is described with reference to FIGS. 9, 10, and 11 below.

Figure 6:
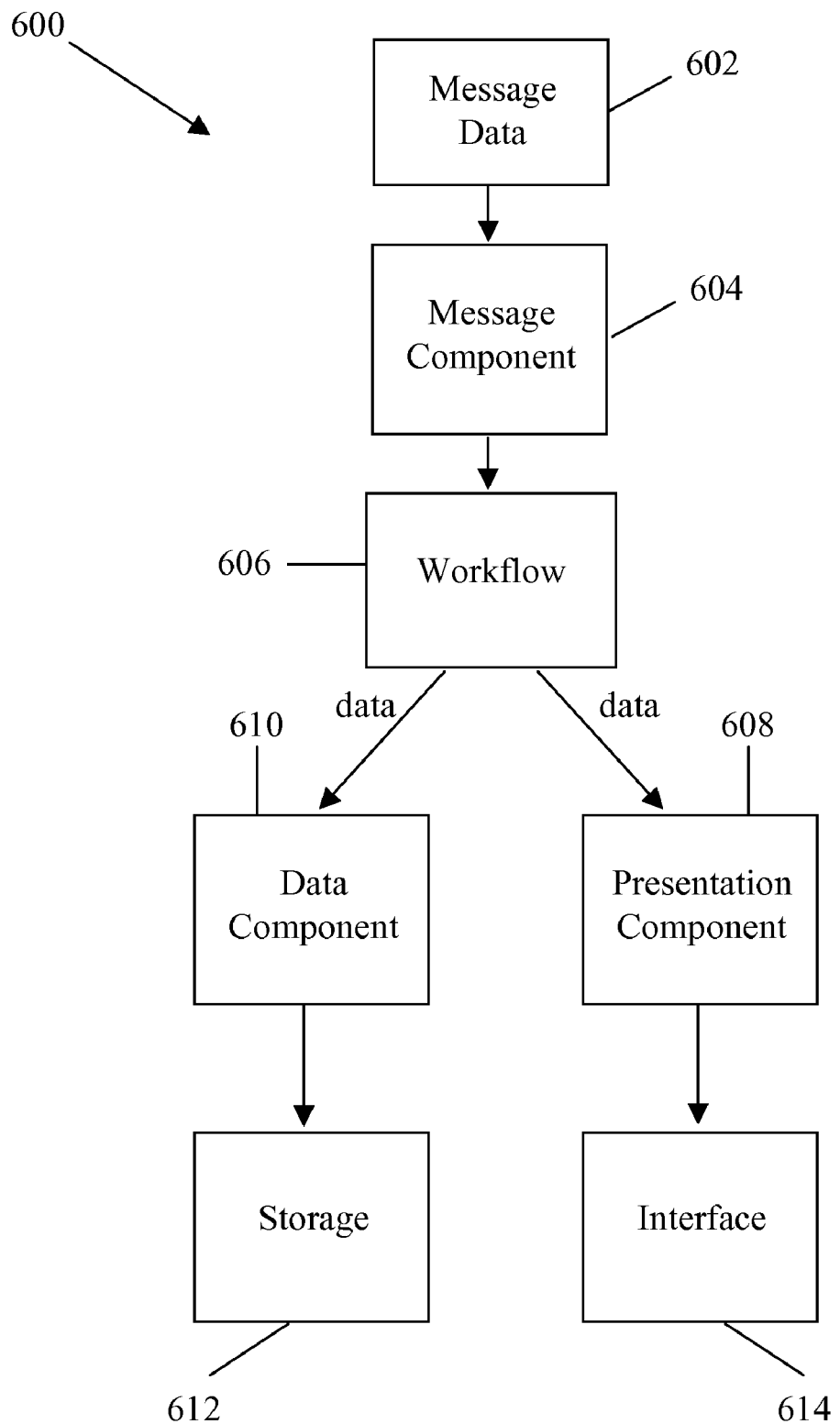
FIG. 6 shows an example method of implementing the component application program of FIG. 5.

Referring to FIGS. 1, 3 and 6, for example, operation 600 shows when the device 100 receives 602 the response message 105 containing message data, the appropriate workflow component 406 interprets 604 the data content of the message 105 according to the appropriate message component 404. The workflow component 406 then processes 606 the data content and inserts 910 the data into the corresponding data component 400 for subsequent storage 612 in the memory module 210 (see FIG. 2). Further, if needed, the workflow component 406 also inserts 608 the data into the appropriate presentation component 402 for subsequent display 614 on the user interface 202 (see FIG. 2).

Figure 7:
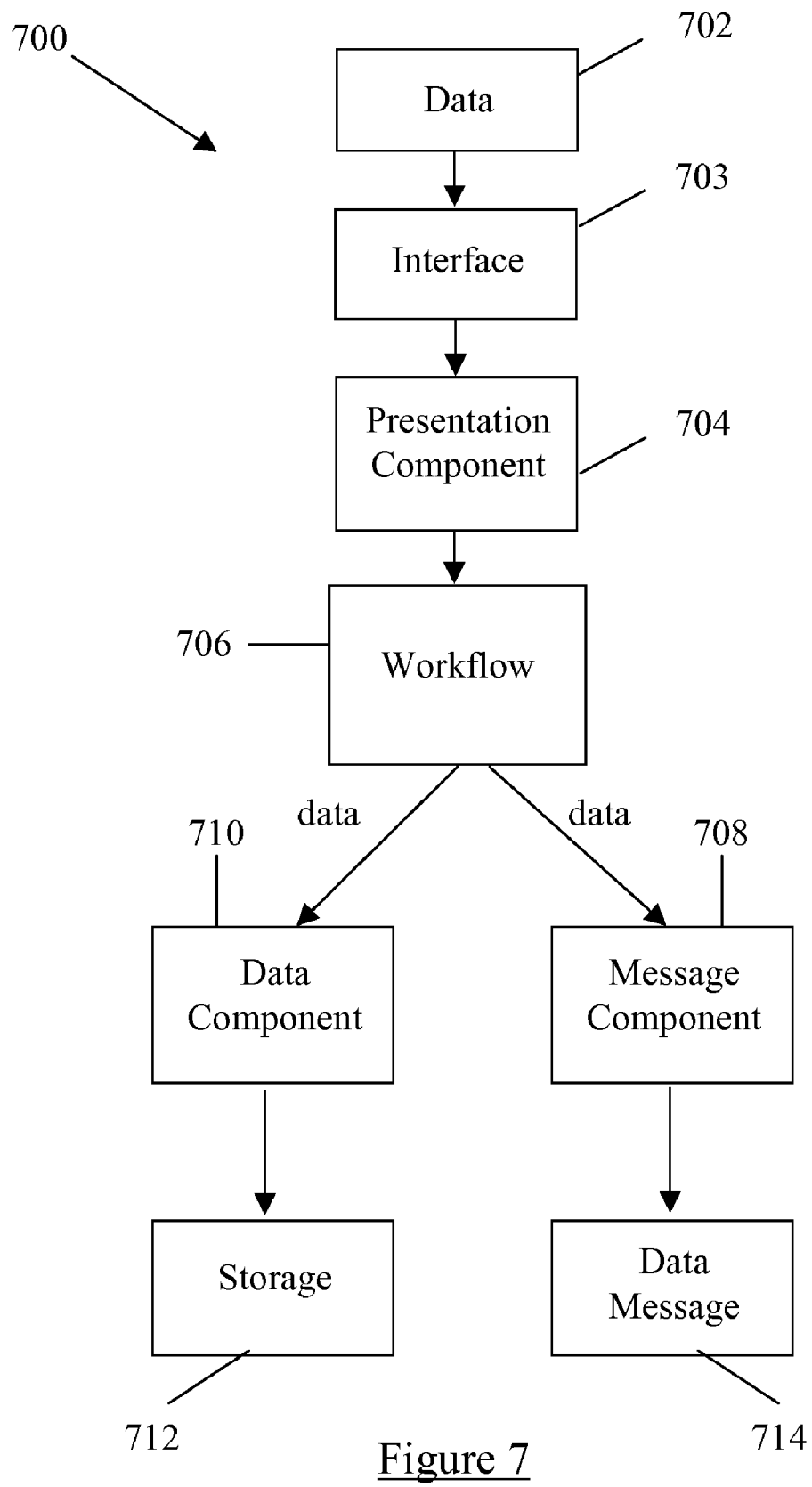
FIG. 7 shows a further example method of implementing the component application program of FIG. 5.

Referring to FIGS. 1, 3 and 7 operation 700 shows data input 702 for an action, such as pushing a button or selecting a menu item, which the user performed 703 on a user-interface element through the user interface 202 (see FIG. 2). The relevant workflow component 406 interprets 704 the input data according to the appropriate presentation component 404 and creates 706 data entities which are defined by the appropriate data components 400. The workflow component 406 then populates 710 the data components 400 with the input data provided by the user for subsequent storage 712 in the memory module 210 (see FIG. 2). Further, the workflow component 406 also inserts 708 the input data into the appropriate message component 404 for subsequent sending 714 of the input data as data entities to the web service in the message 105, as defined by the message component 404.

In the above described operation, it is recognized that operation of the workflow 406 and message 404 components would be correspondingly otherwise if included as a hard-coded part 405 of the application 302.

Predefined and Dynamic Screen Generation

The wireless applications 302 can have predefined sets of screen elements 802 and data objects 800, with the relationship (mapping 804) between these sets being identified at application design phase in the field definitions of the data components 400 and the screen components 404. This model can be referred to as a predefined screen and data relationship model, such that the mapping 804 between the screen elements 802 presented to the user and data objects 800 can be expressed in metadata in the component field definitions using structured language such as XML.

The screen of the user interface 202 can also be dynamically generated based on the structure of the data object 800 associated to the screen elements 802. In some situations the format of a data stream received as input from the server (web service 106), via the message 105 (see FIG. 1), cannot be anticipated in advance (e.g. Web Service 106 operation returning arbitrary XML). In the case where received data stream is presented in a structured format (e.g. XML), the device 100 can make an intelligent prediction, by the framework 206 using defined translation rules, on the screen format (e.g. UI controls, layout, etc.) in order to present the data objects 800 represented by the data stream. This can be done by operating on the XML (for example) nodes in the data stream to build the corresponding data components 400 which are then interpreted by the mapping manager 312 (see FIG. 8) to assign the corresponding screen elements 802 via mapped screen components 402 best determined by the framework 206 to handle the data content of the transformed data stream. The schema for the XML content would be predefined during development of the wireless application 302 and rules to translate the data stream based on the schema into the component definition format that is well understood by the mapping manager 312 and the developer of the translation rules. The translation rules would be part of the mapping manager 312 and designed to translate most commonly encountered XML (for example) structured data stream content. Moreover the user can have the opportunity to update the UI fields and modify the data before it has been stored to the device 100 or sent back to the server.

The following example shows an arbitrary XML data stream fragment of the XML schema:

```
<dataNode1 attr1='val1' attr2='val2'>
    <subDataNode1>abcdefg</subDataNode1>
    <subDataNode2>222</subDataNode2>
    <subDataNode3>333</subDataNode3>
</dataNode1>
<dataNode1 attr1='val1' attr2='val2'>
    <subDataNode1>hijklmnop</subDataNode1>
    <subDataNode2>555</subDataNode2>
    <subDataNode3>666</subDataNode3>
</dataNode1>
```

The mapping manager 312 uses the schema definition provided by the application developer containing the data field definitions

```
<dataEntity name='dataNode1'>
    <dfield name='subDataNode1' type='String' />
    <dfield name='subDataNode2' type='int' />
    <dfield name='subDataNode3' type='int' />
</dataEntity>
``` and dynamically applies translation rules to convert the XML data stream into application acceptable format (as per provided schema) and generate well formed XML data objects 400:

```
<dataEntity name='dataNode1' key='0' >
    <dfield name='subDataNode1' >abcdefg</>
    <dfield name='subDataNode2' >222</>
</dataEntity>
<dataEntity name='dataNode1' key='1' >
    <dfield name='subDataNode1' > hijklmnop </>
    <dfield name='subDataNode2' type='int' >555</>
</dataEntity>
```

Presentation of Data Object on the User Interface

When the screen of the user interface 202 is drawn, the data object 800 displayed for the mapped screen element 802 needs to be resolved. The different options for resolving the specific data object 800 to be used for initial values are as follows:

Screen Parameter Based Initialization

Typically, the data object 800 of the data component 400 with values for the mapped screen elements 802 is passed to the screen of the user interface 202 as a parameter. In the Example screen component 402 given above, the screen 'scrUserInfo' received the data object 800 of a user as the parameter. The screen elements 802 on this screen mapped to the data field definition of the User data component 400 would display a data value from this parameter.

Unresolved Initial Value

If the mapping 804 is defined for the screen, but no initial data object 800 of the related data component 400 has been resolved, then no initial data value would be displayed for the mapped screen elements 802. An example of this would be a screen defined to enter data values for a new user. The initial User data component 400 would not be relevant. After the user enters new values into the data fields of the screen element 802, mapping definitions are used to create a new data object 800 of this data component 400, as described below regarding User Data Updates.

List of All Data Objects

For a choice control/list type of the screen element 802, mapping 804 can specify that all created data objects 800 are to be used, as shown in Example screen component 404 given above.

Screen Presentation

Referring to FIGS. 3, 8, and 9, this scenario 850 describes steps executed for a screen element 802 when a new screen is drawn on the user interface 202. Step 852 the Mapping Manager 312 detects the screen element 802 mapped to the data component 400 field. Step 854, the Mapping Manager 312 checks if this type of data object 800 is attached to the screen—i.e. passed as a parameter. If yes, the Mapping Manager retrieves at step 858 the data field value of the data object 800 and passes it to the presentation manager 308 to display it on the screen. If no, a default value for the field type is displayed at step 856 (e.g. blank for screen, 0 for number, etc.) on the screen 202.

Control to Data Updates

Referring to FIGS. 3 and 8, based on mapping 804 metadata the values the user enters are reflected in the field values of the relevant data object 800 in the memory 210.
The process can involve the following functionality:
input validation
data creation
data update Input Validation
Validation of user entered data could be automatically based on the data component (ex. phone number).

Data Creation
Based on entered values, if a new data key value is encountered, a new data object 800 can be created. In the example data component 400 given above, if a previously undefined name is entered a new User data object 800 is created.

Data Update
Field values of the data object 800 for an existing data component 400 can be updated as a result of user entry on the user interface 202.

Update Operation
A two way update model could work in two modes:
Automatic commit
Data is committed when the user leaves the screen.
Managed transaction mode
A specific menu action (screen element 802) is mapped to process data. For example for a multiple order screen, 'submit' menu item on the last screen would update/create the resultant data object 800. Another menu item (e.g. 'cancel') would result in discarding the entered data.

Figure 10:
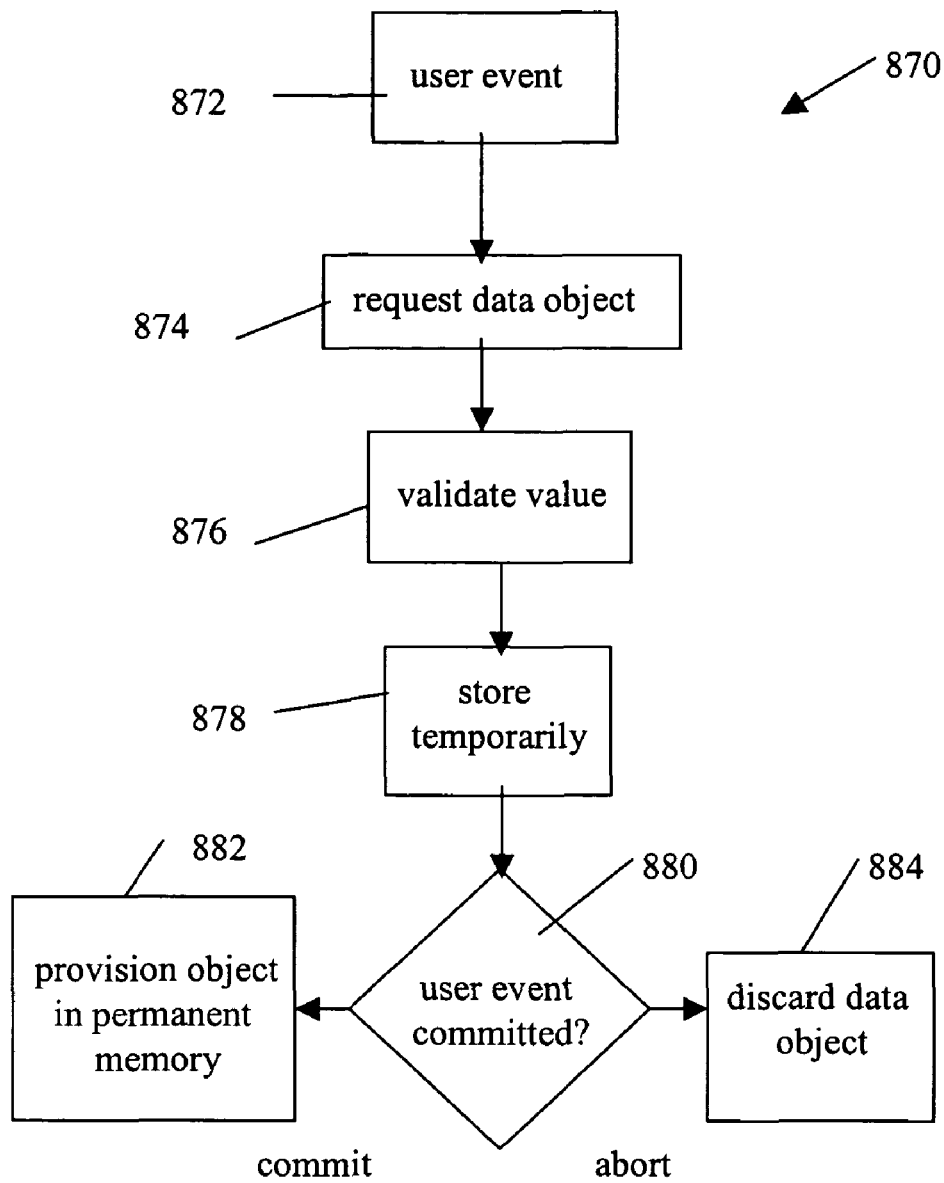
FIG. 10 shows an update of a data object according to user events for the mapping of FIG. 8.
Figure 11:
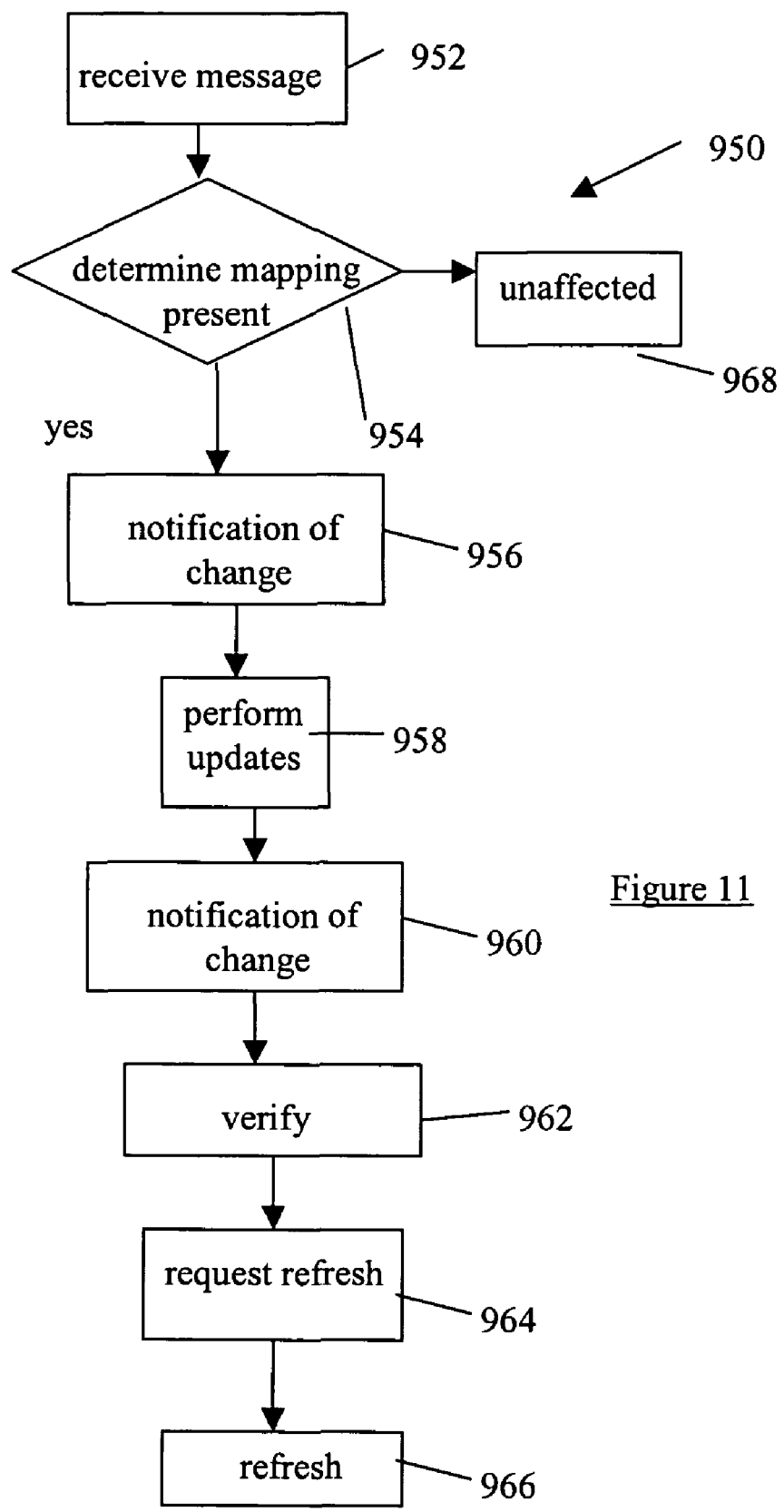
FIG. 11 shows an update of a data object according to an asynchronous message for the mapping of FIG. 8.

Referring to FIGS. 3, 8 and 10, the following scenario 870 describes the flow of mapping user entered data (user events) on the user interface 202 into data object(s) 800. At step 872, as user enters/updates data on the screen element 802, the UI manager 308 passes the value to the Mapping Manager 312. At step 874, if this is a mapped screen element 802, the Mapping Manager 312 resolves the appropriate data component 400 and requests the data object(s) 800 from the Data Manager 310. At step 876, the Data Manager 312 validates that the value entered for the screen element 802 matched to the data component 400 field type this screen element 802 is mapped to. At step 878, the Data Manager 310 keeps the modified data values in a temporary store, as not committed—'dirty' data. The Data Manager 310 also resolves if this was an update of existing data object(s) 800 or a create of new data object(s) 800. At step 880, the user event is determined as committed (option A) or aborted (option B). For a committed determination: OPTION A: commit,
1) User selects a button or a menu item (screen element 802) mapped to the commit action;
2) The UI Manager 308 notifies the Mapping Manager 312 about the action;
3) The Mapping Manager 312 requests the Data Manager 310 to commit changes;
4) The Data Manager 310 commits the changes and stores the data object(s) 800 in the memory 210.
For an aborted determination: OPTION B rollback,
1) User chooses to leave the screen by selecting a button or a menu item (screen element 802) that is not mapped to a commit action;
2) The UI Manager 308 notifies the Mapping Manager 312 about the action;
3) The Mapping Manager 312 requests the Data Manager 310 to rollback the changes;
4) The Data Manager 312 discards the changes—this could mean discarding just the changes to individual fields or removing the whole data object(s) 800 if new ones were created as a result of the screen component 402 to data component 400 mapping 804.

Data to Control Updates
If the device 100 can asynchronously receive data updates from external sources (e.g. web service 106), changes to data values associated with the screen elements 802 would result in a screen refresh with the new information. Referring to FIGS. 3, 8, and 11, on receiving 952 the message 105 from the server 106, the Message Manager 312 determines 954 if this message 105 is mapped to the data component 400 of the currently executing application(s) 302 in the framework 206. If this is the case, then the following further steps are conducted: step 956, the Device framework 206 receives notification from the server 106 about a data change; step 958 the Message Manager 306 notifies the Data Manager 310 to perform any relevant data updates to the data object(s) 800; step 960, the Message Manager 306 also notifies the Mapping Manager 312 of the data changes; step 962, using the mapping 804 metadata the Mapping Manager 312 verifies whether the data changes are relevant to the current screen; step 964, if changes are related to the currently displayed information the Mapping Manager 312 requests UI Manager 308 to refresh the screen; and step 966 the screen is refreshed to display the updated data objects 800. Otherwise, step 968 the message 105 does not affect current values of the screen elements 802 displayed on the user interface 202. Accordingly, in view of the above, the message manager 306 receives the message 105, which causes the corresponding data object 800(s) to be updated/created. Changes to the data objects 800 are then reflected in the screen elements 802 using the linked data component and corresponding data object(s) 800. This linked update/creation procedure between messages 105 and screen elements 802 (through the linked data components 400 and associated data object(s) 800) results in automatic refresh of the screen by the UI manager 308. (i.e. the user would see updated data in the screen elements 802).

Although the disclosure herein has been drawn to one or more exemplary systems and methods, many variations will be apparent to those knowledgeable in the field, and such variations are within the scope of the application. For example, although XML and a subset of ECMAScript are used in the examples provided, other languages and language variants may be used to define the component applications 302. Further, it is recognised as an alternative to the above described mapping 804, the definition of the data fields could be contained in the screen component 402 (see FIG. 4). Therefore, the generation of the screen elements 802 would be based on data field definitions included in the screen component 402 definitions, and the data component 400 would be mapped 804 to the corresponding screen component 402 having included data field definitions. Accordingly, generation of the data objects 800 would rely upon data field definitions contained in the mapped screen component 402.

The embodiments of the invention in which an exclusive property or privilege is claimed are defined as follows:

1. A method executed by a processor operating on a wireless device for generating a screen element, based on a data object, of a component application executing on the wireless device for display on a user interface of the wireless device, the component application including a data component having at least one data field definition and a screen component having at least one screen element definition, the components being defined in a structured definition language, the method comprising the steps of:
   selecting the screen component corresponding to the screen element selected for display;
   identifying at least one mapping present in the screen component, the mapping for specifying dynamic relationships between the screen component and the data component as defined by an identifier representing the mapping;
   wherein a mapping manager maintains dynamic data integrity and automatically synchronizes changes between the screen component and the corresponding data component and vice versa in a runtime environment;
   selecting the data component mapped by the mapping according to the mapping identifier;
   obtaining a data object field value corresponding to the data field definition of the mapped data component;
   generating a screen element from the screen element definition to include the data object field value according to the format of the data field definition as defined in the mapped data component.

2. The method according to claim 1, wherein a plurality of the data field definitions of the data component is shared between the screen component and the data component as represented by the mapping.

3. The method according to claim 2 further comprising the step of linking the plurality of data field definitions to corresponding ones of the screen element definitions of the screen component as represented by the identifier.

4. The method according to claim 2 further comprising the step of detecting a user event of the user interface related to the screen element.

5. The method according to claim 4 further comprising the step of identifying the mapping in the screen component corresponding to the linked data component of the affected screen element.

6. The method according to claim 5 further comprising the step of updating the data object in a memory using the data field definition of the linked data component.

7. The method according to claim 5 further comprising the step of creating a new one of the data object in a memory using the data field definition of the linked data component.

8. The method according to claim 2, wherein the data object field value is obtained by being passed to the user interface as a parameter.

9. The method according to claim 2, wherein a first screen element definition is mapped by a first one of the identifiers to a first one of the data components and a second screen element definition is mapped by a second one of the identifiers to a second one of the data components different from the first data component.

10. The method according to claim 9, wherein the first screen element definition and the second screen element definition are mapped to the same data component using the first identifier.

11. The method according to claim 2, wherein the structured definition language is XML based.

12. The method according to claim 2, wherein the identifier is a simple primary key.

13. The method according to claim 2, wherein the identifier is a composite key.

14. The method according to claim 2 further comprising the step of receiving an asynchronous communication message by the device via a network coupled to the device, the message including a message data object.

15. The method of claim 14 further comprising dynamically defining said data field definition at runtime in response to a format of said message data object received in said message.

16. The method according to claim 14 further comprising the step of checking the asynchronous communication message for the mapping corresponding to the data component of the application provisioned on the device.

17. The method according to claim 16 further comprising the step of updating the data component in accordance with the message and then reflecting the update in the screen element linked to the data component.

18. The method according to claim 16 further comprising the step of creating the data object corresponding to the message in a memory using the data field definition of the linked data component.

19. The method of claim 1 wherein the use of the mapping reduces the amount of instructions to define the screen component or perform screen handling.

20. A system for generating a screen element, based on a data object, of a component application executing on a wireless device, for display on a user interface of the wireless device, the component application including a data component having at least one data field definition and a screen component having at least one screen element definition, the components being defined in a structured definition language, the system having memory for storing computer readable instructions and a processor configured to executed the instructions, the instructions for providing:
- a mapping manager for identifying at least one mapping present in the screen component, the mapping for specifying dynamic relationships between the screen component and the data component as defined by an identifier representing the mapping, and for selecting the data component mapped by the mapping according to the mapping identifier and wherein the mapping manager maintains dynamic integrity and automatically synchronizes changes between the screen component and the corresponding data component and vice versa in a runtime environment;
- a data manager for obtaining a data object field value corresponding to the data field definition of the mapped data component; and
- a presentation manager for generating a screen element from the screen element definition to include the data object field value according to the format of the data field definition as defined in the mapped data component.

21. The system according to claim 20, wherein a plurality of the data field definitions of the data component is shared between the screen component and the data component as represented by the mapping.

22. The system according to claim 21, wherein the plurality of data field definitions are linked to corresponding ones of the screen element definitions of the screen component as represented by the identifier.

23. The system according to claim 21 wherein the presentation manager is further configured for detecting a user event of the user interface related to the screen element.

24. The system according to claim 23 wherein the mapping manager is further configured for identifying the mapping in the screen component corresponding to the linked data component of the related screen element.

25. The system according to claim 24 wherein the data manager is further configured for updating the data object in a memory using the data field definition of the linked data component.

26. The system according to claim 24 wherein the data manager is further configured for creating a new one of the data object in a memory using the data field definition of the linked data component.

27. The system according to claim 21, wherein the data object field value is obtained by being passed to the user interface as a parameter.

28. The system according to claim 21, wherein a first screen element definition is mapped by a first one of the identifiers to a first one of the data components and a second screen element definition is mapped by a second one of the identifiers to a second one of the data components different from the first data component.

29. The system according to claim 28, wherein the first screen element definition and the second screen element definition are mapped to the same data component using the first identifier.

30. The system according to claim 21, wherein the structured definition language is Extensible Markup Language (XML) based.

31. The system according to claim 21, wherein the identifier is a simple primary key.

32. The system according to claim 21, wherein the identifier is a composite key.

33. The system according to claim 21 further comprising a communication manager for receiving an asynchronous communication message by the device via a network coupled to the device, the message including a message data object.

34. The system of claim 33 further configured to dynamically define said data field definition at runtime in response to a format of said message data object received in said message.

35. The system according to claim 21 wherein the mapping manager is further configured for checking the message for the mapping corresponding to the data component of the application provisioned on the device.

36. The system according to claim 35 wherein the data manager is further configured for updating the data component in accordance with the message and then reflecting the update in the screen element linked to the data component.

37. The system according to claim 35 further comprising the data manager configured for creating the data object corresponding to the message in a memory using the data field definition of the linked data component.

38. The system of claim 20 wherein the use of the mapping reduces the amount of instructions to define the screen component or perform screen handling.

39. A method executed by a processor of a wireless device for generating a data object of a component application executing on the wireless device based on a change in a screen element displayed on a user interface of a wireless device, the component application including a data component having at least one data field definition and a screen component having at least one screen element definition, the components being defined in a structured definition language, the method comprising the steps of:
- selecting the screen component corresponding to the screen element;
- identifying at least one mapping present in the screen component, the mapping for specifying dynamic relationships between the screen component and the data component;
- wherein a mapping manager maintains dynamic integrity and automatically synchronizes changes between the screen component and the corresponding data component and vice versa in a runtime environment;
- selecting the data component mapped by the mapping;
- obtaining a changed value from the screen element corresponding to the mapped data component;
- assigning the changed value to a data field value of the data object according to the format of the data field definition as defined in the mapped data component.

40. The method of claim 39 wherein the use of the mapping reduces the amount of instructions to define the screen component or perform screen handling.

41. A wireless device having a processor for generating a screen element, based on a data object, of a component application executing on the wireless device for display on a user interface of the wireless device, the component application including a data component having at least one data field definition and a screen component having at least one screen element definition, the components being defined in a structured definition language, the wireless device comprising:
- means for selecting the screen component corresponding to the screen element selected for display;
- means for identifying at least one mapping present in the screen component, the mapping for specifying dynamic relationships between the screen component and the data component;
- a mapping manager to maintain dynamic integrity and automatically synchronize changes between the screen component and the corresponding data component and vice versa in a runtime environment;
- means for selecting the data component mapped by the mapping;
- means for obtaining a data object field value corresponding to the data field definition of the mapped data component;
- means for generating a screen element from the screen element definition to include the data object field value according to the format of the data field definition as defined in the mapped data component.

42. The wireless device of claim 41 wherein the use of the mapping reduces the amount of instructions to define the screen component or perform screen handling.

43. The wireless device of claim 41 wherein a plurality of the data field definitions of the data component is shared between the screen component and the data component as represented by the mapping; and wherein the wireless device further comprises: means for receiving an asynchronous communication message by the device via a network coupled to the device, the message including a message data object and means to dynamically define said data field definition at runtime in response to a format of said message data object received in said message.

44. A non-transitory computer readable medium comprising instructions for generating a screen element, based on a data object, of a component application executing on a wireless device for display on a user interface of the wireless device, the component application including a data component having at least one data field definition and a screen component having at least one screen element definition, the components being defined in a structured definition language, the instructions, when implemented on a computing device, cause the computing device to implement the steps of:
- selecting the screen component corresponding to the screen element selected for display;
- identifying at least one mapping present in the screen component, the mapping for specifying dynamic relationships between the screen component and the data component as defined by an identifier representing the mapping;
- maintaining dynamic integrity and automatically synchronizing changes between the screen component and the corresponding data component and vice versa in a runtime environment;
- selecting the data component mapped by the mapping according to the mapping identifier;
- obtaining a data object field value corresponding to the data field definition of the mapped data component;
- generating a screen element from the screen element definition to include the data object field value according to the format of the data field definition as defined in the mapped data component.

45. The computer readable medium of claim 44 wherein the use of the mapping reduces the amount of instructions to define the screen component or perform screen handling.

46. The computer readable medium of claim 44 wherein a plurality of the data field definitions of the data component is shared between the screen component and the data component as represented by the mapping and wherein the instructions further cause the computing device to: receive an asynchronous communication message via a network coupled to the computing device, the message including a message data object and dynamically define said data field definition at runtime in response to a format of said message data object received in said message.

* * * * *